(12) United States Patent
Pedlar et al.

(10) Patent No.: US 8,622,872 B2
(45) Date of Patent: Jan. 7, 2014

(54) METHOD AND CONTROL SYSTEM FOR OPENING THE DRIVETRAIN OF A MOTOR VEHICLE

(75) Inventors: Chris Edward Pedlar, Chelmsford (GB); Urs Christen, Aachen (DE); Rainer Busch, Aachen (DE); Chris Connelly, Essex (GB); Ingo Lenz, Cologne (DE); Harry Cho, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 13/277,930

(22) Filed: Oct. 20, 2011

(65) Prior Publication Data
US 2012/0100960 A1    Apr. 26, 2012

(30) Foreign Application Priority Data
Oct. 20, 2010   (DE) .................. 10 2010 060 079

(51) Int. Cl.
*B60W 10/02*    (2006.01)
(52) U.S. Cl.
USPC ........................................ 477/181

(58) Field of Classification Search
USPC .......................... 477/167, 179, 181
See application file for complete search history.

(56) References Cited

U.S. PATENT DOCUMENTS

| | | | | |
|---|---|---|---|---|
| 3,709,344 A | * | 1/1973 | Sieren | 477/167 |
| 4,192,279 A | * | 3/1980 | Maisch et al. | 123/198 F |
| 6,371,889 B1 | * | 4/2002 | Kuroda et al. | 477/181 |
| 2010/0222973 A1 | * | 9/2010 | Senda et al. | 701/54 |

FOREIGN PATENT DOCUMENTS

| | | |
|---|---|---|
| DE | 19507622 A1 | 9/1995 |
| EP | 0071039 A2 | 2/1983 |
| EP | 0243196 A1 | 4/1987 |
| EP | 1491788 A1 | 12/2004 |
| GB | 432802 | 8/1935 |
| GB | 1539801 | 7/1976 |

* cited by examiner

*Primary Examiner* — Edwin A Young
(74) *Attorney, Agent, or Firm* — Julia Voutyras; Alleman Hall McCoy Russell & Tuttle LLP

(57) ABSTRACT

A system and method for selectively opening a drivetrain of a vehicle is described. In one example, an electrically operated clutch is opened during selected driving conditions to conserve kinetic energy of the vehicle. The method may reduce fuel consumption during selected conditions.

20 Claims, 2 Drawing Sheets

METHOD AND CONTROL SYSTEM FOR OPENING THE DRIVETRAIN OF A MOTOR VEHICLE

RELATED APPLICATIONS

This application claims priority to German Patent Application No. 102010060079.2, entitled "Method and Control System for Opening the Drivetrain of a Motor Vehicle," filed Oct. 20, 2010, the entire contents of which are herein incorporated by reference for all purposes.

FIELD

The present description relates to a method and a control system for opening the drivetrain of a motor vehicle, in particular of a motor vehicle having a transmission.

BACKGROUND AND SUMMARY

Kinetic energy recovery systems for motor vehicles which convert kinetic energy of the motor vehicle into electrical energy which is stored in a battery or a high power capacitor can save energy. Likewise, systems that store rotational energy in a flywheel can also save energy. The energy which is stored in this way can subsequently be converted into torque for the purpose of vehicle propulsion in order to assist an internal combustion engine of a motor vehicle. A disadvantage of such systems is that there may be low conversion efficiency back and forth between the energy system components.

Under certain circumstances it may be advantageous to save kinetic energy in its present form instead of storing it. In the case of internal combustion engines with an automatic transmission there are possible ways of opening the drivetrain so that braking torques, such as are caused by the engine and possible kinetic energy recovery systems, are reduced. This leads to a condition in which the vehicle is decelerated to a lesser degree and therefore continues to move forward.

The description is based on the object of saving energy in motor vehicles with a manual transmission. The description is set forth with the features of the claims.

The inventors herein have recognized the above-mentioned disadvantages and have developed a method for operating a vehicle drivetrain, comprising: automatically decoupling an engine from vehicle wheels in response to a driver releasing an accelerator pedal, the vehicle drivetrain including a driver operated clutch.

By decoupling an engine from vehicle wheels during conditions where an accelerator is not applied, it may be possible to reduce engine fuel consumption. For example, when a vehicle is coasting without accelerator input, the vehicle may coast farther when the engine is decoupled from the vehicle wheels since the engine does not act to brake the vehicle. Further, the engine can be decoupled from the vehicle wheels differently depending on conditions such as road grade, ambient temperature, and vehicle towing state.

The present description may provide several advantages. Specifically, the approach may reduce engine fuel consumption. Further, the approach may reduce vehicle emissions by allowing an engine to be stopped during vehicle coast conditions (e.g., where the vehicle is moving without torque from an engine) for a longer period of time. Further still, the approach may be useful for teaching a driver fuel saving driving techniques.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

The drawings included herein serve merely for the explanation of the description, and do not restrict the description. The reference symbols that are common to more than one figure are used to denote identical or similar parts between different figures.

DETAILED DESCRIPTION

Figure 1:
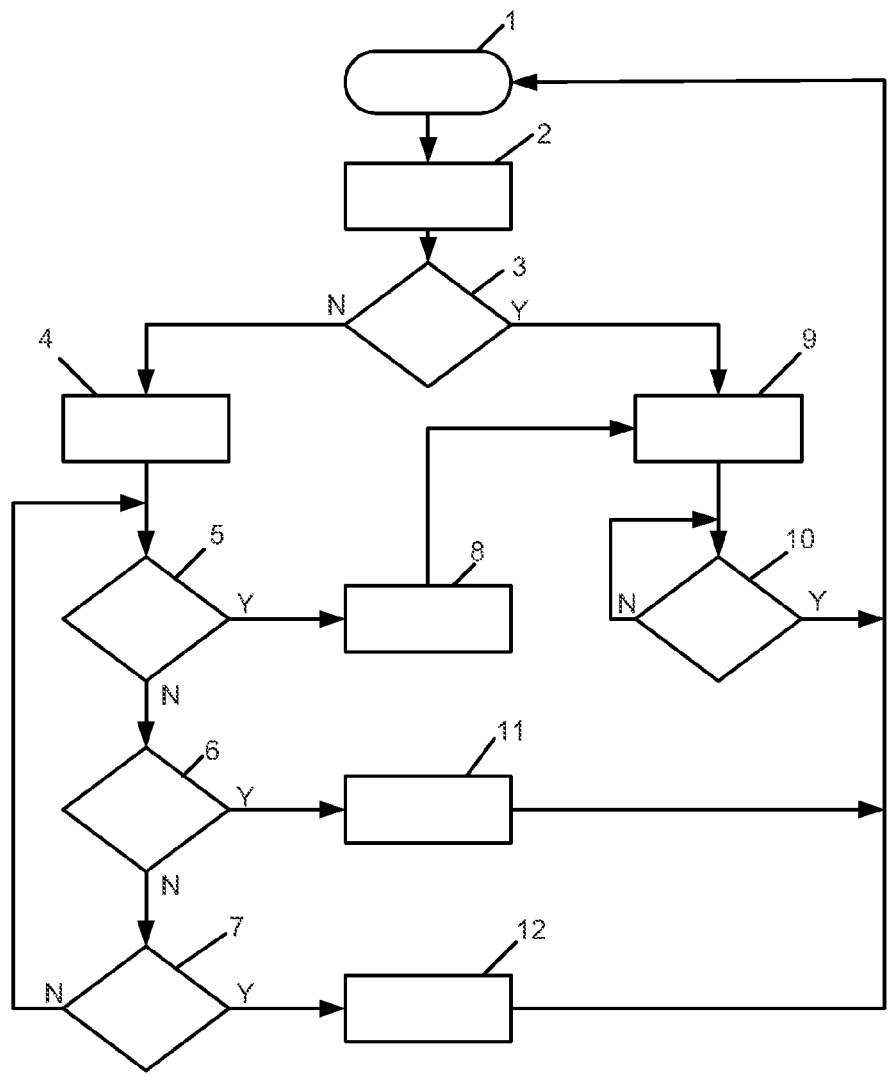
FIG. 1 is a flowchart of a method for opening the drivetrain of a motor vehicle according to the description.
Figure 2:
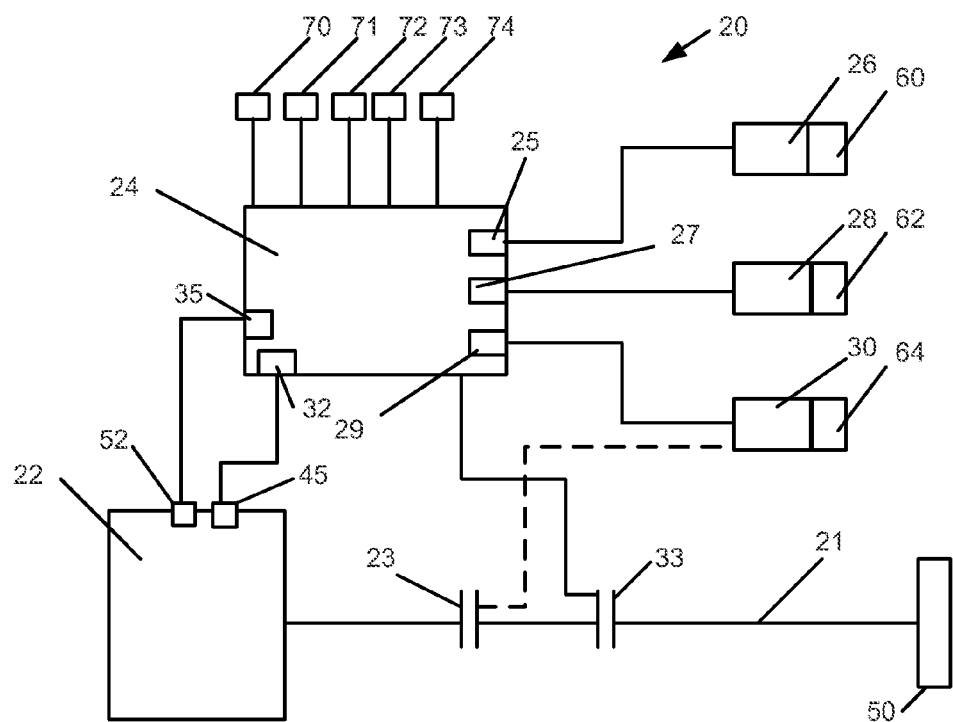
FIG. 2 shows a block diagram of a control system for opening the drivetrain of a motor vehicle according to the description.

The present description is related to operating a vehicle drivetrain so as to reduce fuel consumption. FIG. 1 describes a method for operating a vehicle drivetrain while FIG. 2 provides an example system where the method of FIG. 1 may be executed.

According to a first aspect of the description, a method for opening the drivetrain of a motor vehicle having a manual transmission comprises the steps: detection of the state of the accelerator pedal; and opening of the drivetrain when the driver releases the accelerator pedal, e.g. takes his foot off the accelerator pedal.

The method can also be applied in motor vehicles with a manual transmission to save energy (e.g., fuel) during the actual operation of the motor vehicle. Furthermore, there is an incentive for the driver to adapt his driving style to optimize the fuel consumption. As a result of the opening of the drivetrain, braking systems are disconnected from the wheels with the result that the motor vehicle can continue to roll unimpeded, thereby saving energy.

The drivetrain can be opened when the driver releases the accelerator pedal or takes his or her foot off the accelerator pedal, and does not activate the brake pedal. As a result, it is possible, as it were, to set the sensitivity of the method and provide an additional disengagement or opening threshold.

The state of the clutch pedal, of the selected gear speed, of the speed of the vehicle, of the ambient temperature, of the positive gradient or of the negative gradient and/or of a trailer hitch can be detected. The states can be used to open or close the drivetrain and permit better adaptation of the method to the motor vehicle. Further parameters such as charge state of the battery, the climate of the passenger compartment of the vehicle etc. can also be taken into account.

The drivetrain can be opened independently of the position of the clutch pedal. This can take place by virtue of a further clutch which cannot be directly controlled by the driver, such as for example an electronic drive-by-wire clutch. After the drivetrain opens, the engine of the motor vehicle can be switched off, which leads to a further fuel saving.

The drivetrain can be closed so as to couple the engine to the wheels when the driver depresses the accelerator pedal or the brake pedal and/or releases a previously depressed clutch pedal. A reliable changeover is therefore brought about from the state of the opened drivetrain back to the normal state with a closed drivetrain.

Depending on at least one of the detected states, it is possible firstly not to open the drivetrain but rather to close the fuel supply to the engine. It is therefore possible, depending on the condition, to save energy without the drivetrain being directly opened if it is desired, for example, for reasons of comfort.

When the drivetrain is opened, it is possible to close the drivetrain and the fuel supply to the engine depending on detection of activation of the brake. This permits, when the state with an opened drivetrain ends, a return into an intermediate state without a fuel supply, which saves energy compared to the normal state with an opened drivetrain and an opened fuel supply.

According to a second aspect of the description, a control system for opening the drivetrain of a motor vehicle having a manual transmission comprises a signal input for receiving a status signal from a throttle function, and a clutch for opening the drivetrain when the throttle function is not active. The drivetrain is opened by way of the clutch, that is to say the engine is disconnected from the wheels, as a result of which the motor vehicle as it were coasts along without requiring fuel and without masses or torques at the drivetrain braking the movement of the motor vehicle.

The control system can comprise a signal input for receiving a status signal from the brake function, wherein the clutch is opened when the brake function is not active and the throttle function is not active. This takes into account not only the position of the accelerator pedal but also the position of the brake pedal, which permits finer observation of the driver's intention and can therefore make available a higher level of comfort.

The control system for opening the drivetrain can comprise a control output which communicates with an engine of the motor vehicle, wherein, after the drivetrain opens, the motor is switched off by means of a control signal via the control output. Energy can be additionally saved by switching off the engine. The control system can, for example, be integrated into the engine controller but can also constitute a separate module or the control system is distributed among one or more already present modules such as, for example, the ABS control module or ESP module etc.

The control system for opening the drivetrain can comprise at least one sensor for detecting the state of the accelerator pedal, brake pedal, clutch pedal, selected gear speed, transmission neutral position, of the speed of the vehicle, of the ambient temperature, of the gradient and/or of a trailer hitch. By means of the sensor signals, the control system can be adapted better to the motor vehicle and/or to the current conditions. Furthermore, safety functions and/or service functions can be additionally activated.

The control system for opening the drivetrain can contain an electronic clutch, which can be activated by a control signal of the control system. In this way, the drivetrain can easily be opened without the clutch which has to be activated by the driver.

Referring now to FIG. 1, a flowchart of a method for opening the drivetrain of a motor vehicle having a manual transmission is shown. At 1, the motor vehicle is traveling where the engine is mechanically coupled to the vehicle wheels; this state can also be referred to as a normal state with a closed drivetrain. If the driver of the motor vehicle then deactivates or releases the accelerator pedal or the throttle function at 2, that is to say takes his foot off the accelerator pedal, checking for the purpose of opening the drivetrain starts at 3. Additionally, at 2 or 3, the state of the brake pedal or of the brake function can be detected in addition to the state of the accelerator pedal. If the driver of the motor vehicle does not activate the brake pedal in this optional sequence, the checking continues at 3. The state of the brake and accelerator may be determined via sensors providing signals indicative of respective brake and accelerator positions.

At 3, it is checked whether a reason arising from a hindrance exists for opening the drivetrain. Reasons arising from hindrances can be, for example, dependent on the state of the clutch pedal, the selected gear speed, the speed of the vehicle, the ambient temperature, the gradient and/or a trailer hitch. For example, if the driver operated clutch pedal is applied during an accelerator off state, the drivetrain may not be automatically opened. Further, in some examples where a trailer is coupled to the vehicle and a downhill grade is present, the electrically actuated clutch may not be opened so that dynamic engine braking may be provided.

It should be noted that automatically operating a clutch constitutes opening the clutch based on vehicle system inputs in the absence of a direct driver request to operate the clutch via actuating a clutch pedal, for example. A driver operating the clutch constitutes the driver applying or releasing a clutch pedal or other device directly for a sole purpose of operating the drivetrain clutch. Thus, a driver depressing a clutch pedal that operates a clutch through a controller receiving input from the clutch pedal, for example, is a driver operated clutch application. Conversely, when a controller receives braking and vehicle speed inputs without a driver request to operate the clutch, and the controller decides to operate a clutch, the clutch is automatically operated.

If the checking has revealed that there is no reason arising from a hindrance, the system branches to 4 in which the drivetrain is opened. The opening of the drivetrain means that the engine and possibly existing engine recovery systems (e.g., an electric motor) are disconnected from the wheels, which permits unbraked and therefore energy-saving coasting of the vehicle. In order to obtain an additional saving in energy, at 4 the engine can be switched off in addition to the opening of the drivetrain. The same reasons arising from a hindrance at 3 can be used for the decision as to whether the engine is switched off. The priorities and/or effects of the criteria for this decision at 4 may be different from those at 3.

At 4, the motor vehicle is in what is referred to as an energy saving state in which the drivetrain is opened automatically without a direct driver command to open the drivetrain. As a result of the opening of the drivetrain and the removal of braking torques, the motor vehicle is decelerated less and therefore continues to move along as if the engine were driven via the transmission. A relationship can be formed between the gradient on which the motor vehicle is located at that particular time and the preferred behavior of the motor vehicle, such as when to decouple and couple the electrically operated clutch. For more steep gradients on which the motor vehicle with a closed drivetrain either maintains its speed or accelerates, the drivetrain remains advantageously closed. The braking force of the engine helps to control the motor vehicle, and in this context it is possible to achieve a saving in fuel if the fuel supply of the engine is closed. On the other hand, for less steep gradients on which the motor vehicle would decelerate when the drivetrain was closed, it is advantageous to open the drivetrain when the driver takes his foot off the accelerator pedal and does not depress the brake. In this case, the engine can be held in the idling mode or it is permitted to stop the engine, which depends on factors such as, for example, the speed of the vehicle. Even if the engine is in the idling mode, it will typically consume less fuel than a conventional motor vehicle in which the driver is forced to open the throttle somewhat in order to overcome the braking torques and maintain the forward movement. In some examples, the automatic decoupling of the engine from the vehicle wheels is suspended when a road gradient is greater than a threshold gradient and when a trailer is coupled to the trailer hitch receiver This functionality is helpful in lowering the fuel consumption and the $CO_2$ emissions not only in the case of gradients. Whenever the driver opens the throttle and, under certain circumstances, does not activate the brake, this is an occasion to open the drivetrain and allow the vehicle to coast or roll. Furthermore, the driver can learn to adapt his driving style and to accelerate with a better efficiency level of the engine in order then to take his foot off the accelerator pedal and allow the vehicle to advance. This behavior achieves considerable savings in fuel consumption while an acceptable forward movement is ensured.

After 4, the states of the brake pedal (at 5), of the clutch (at 6) and of the accelerator pedal (at 7) are detected. The activation of one or more pedals indicates the driver's intention to wish to leave the state of rolling. If the driver activates the brake, that is to say if he depresses the brake pedal, the system branches from 5 to 8. At 8, the drivetrain is closed, and if appropriate, the engine is switched on again, and if appropriate, the speed of the engine is adapted to the speed of the vehicle and to the selected gear speed. In some examples, the engine is restarted without an electric starter. Once this has occurred, the system branches to 9.

At 9, the fuel supply to the engine is switched off, as a result of which when the drivetrain is closed the engine continues to rotate but fuel is not actively consumed. If one of the reasons arising from a hindrance is met at 3, the system also branches to 9. That is to say when a reason arising from a hindrance is present, the drivetrain is not opened but rather the fuel supply to the engine is merely switched off.

The method proceeds from 9 to 10 where it is detected whether the driver activates the accelerator pedal. If this is not the case, the method remains at 9. If the driver activates the accelerator pedal, the system branches back to 1, the normal state, in which possible opening of the drivetrain is checked again.

If the driver activates the clutch with the drivetrain open (detected at 6), the system branches to 11. According to 11, the function of the clutch pedal is followed or, in other words, the driver can assume full control again. If the clutch remains open, the system branches back again to the normal state 1. If the driver closes the clutch again, the system can either branch back to 6, that is to say into the energy saving state with the drivetrain opened, or to 1, that is to say into the normal state.

If the driver activates the accelerator pedal when the drivetrain is opened (at 7), the system branches to 12. At 12, the drivetrain is closed, and if appropriate the engine is switched on again and, if appropriate, the speed of the engine is adapted to the speed of the vehicle and to the selected gear speed. Once this has occurred, the system branches into the normal state at 1.

Optional measures for informing the driver about the state of the method are not illustrated but may be provided. Said steps can serve to improve the driver's awareness or adapt the driver to the method in order, for example, to save more fuel.

Thus, the method of FIG. 1, provides for a method for operating a vehicle drivetrain, comprising: automatically decoupling an engine from vehicle wheels in response to a driver releasing an accelerator pedal, the vehicle drivetrain including a clutch that can be operated both automatically and by the driver. The method includes where a state of a brake pedal is detected, and where the drivetrain is opened via a clutch when a driver releases an accelerator pedal and does not activate a brake pedal. Note that the clutch may not be opened via a direct command of the driver. The method also includes where a state of a clutch pedal, a selected gear speed, a speed of a vehicle, an ambient temperature, a road gradient, and a state of a trailer hitch receiver are detected. The method also includes where a drivetrain clutch is opened independently of a position of a clutch pedal.

In some examples, the method further comprising ceasing combustion in the engine after the engine is decoupled from the vehicle wheels. In this way, engine fuel consumption may be further reduced. The method also includes where combustion in the engine is ceased via stopping fuel flow to the engine via a fuel injector. The method further comprises coupling the engine to the vehicle wheels after the engine is decoupled from the vehicle wheels in response to the driver operating the accelerator pedal, a brake pedal, or the clutch pedal.

The method of FIG. 1 also provides for operating a vehicle drivetrain, comprising: stopping fuel flow to an engine while a driver operated clutch is not operated (or while a driver operated clutch is not engaged); and automatically decoupling the engine from vehicle wheels while the driver operated clutch pedal is not operated or without the driver disengaging the clutch and in response to a driver releasing an accelerator pedal. The method further comprising basing the automatic decoupling of the engine from the vehicle wheels depending on a road gradient. The method further comprises basing the automatic decoupling of the engine from the vehicle wheels depending on a state of a trailer hitch receiver. The method includes where automatic decoupling of the engine from the vehicle wheels is suspended when a road gradient is greater than a threshold gradient and when a trailer is coupled to the trailer hitch receiver.

In one example, the method further comprising coupling the engine to the vehicle wheels in response to a driver applying an accelerator pedal and starting the engine after the engine is coupled to the vehicle wheels. In this way, the vehicle inertia can assist in starting the engine. Further, the method includes where the engine is started without an electric starter.

FIG. 2 shows a control system 20 for opening a drivetrain 21 of a motor vehicle having a manual transmission. The motor vehicle has an engine 22 which is connected to the drivetrain 21 via a clutch 23 which can be activated by the driver. Wheels of the vehicle 50 are connected to the drivetrain 21. A controller 24 of the control system 20 has a signal input 25 for receiving a sensor signal from a sensor 26 of accelerator pedal 60 which detects the state of the accelerator pedal. A further signal input 27 serves to receive a sensor signal from a brake sensor 28 of brake pedal 62 which detects the state of the brake pedal 62. A further signal input 29 receives signals of a clutch sensor 30 of the clutch pedal 64 which operates and detects the state of the clutch 23 or of the clutch pedal 64.

The sensors 26, 28 and 30 can be arranged directly on the corresponding pedals 60, 62, and 64 or on the elements on which the pedals act, that is to say brakes, throttle function or clutch. The sensors can also monitor signals or derived variables in a way which is characteristic for the respective function, for example from the engine controller. Three signal inputs 25, 27 and 29 of the controller 24 are shown here. Alternatively, a signal input or a bus system can also be used.

The controller 24 is connected to one or more sensors which detect the state of the selected gear speed 70, of the speed of the vehicle 71, of the ambient temperature 72, of the road gradient 73 and/or of a trailer hitch receiver 74.

The controller 24 comprises a control output 32 which is connected to the engine 22 of the motor vehicle. In one example, the controller output 32 deactivates fuel injectors 45. Another controller output 35 can deactivate engine spark to stop the engine. The controller 24 can switch off the engine 22 and also switch it on again via the control outputs 32 and 35. In addition, the controller 24 is connected to an electronic clutch 33 which can be opened and closed by a control signal of the controller 24 or of the control system 20.

In some examples, a single clutch may provide the functionality of clutches 23 and 33. Thus, system may include a single drivetrain clutch that responds to the driver and the controller. For example, electric clutch 33 may be configured to accept commands from the driver and automatic commands from the controller 24 such that clutch 33 may be operator or automatically operated. In particular, when the driver depresses clutch pedal 64, controller 24 opens electric clutch 33. Similarly, when the driver releases clutch pedal 64, controller 24 closes electric clutch 33. Thus, a single electrically controlled clutch may provide the functionality of an electrically controlled clutch and a clutch that is operated by a driver. When a single clutch can be operated by a driver or automatically, controller 24 may include instructions for assigning priority to a driver operating the clutch. For example, driver commands to operate electric clutch 33 may be given higher priority than automatic commands to operate the clutch during selected vehicle operating conditions. As such, electric clutch 33 may follow driver commands rather than automatically generated commands during some conditions, if desired.

By way of the sensors 26, 28, and 30, the controller 24 detects the state of the motor vehicle and the driver's intention in order to use this information to decide whether the drivetrain 21 is to be opened. By way of the electronic clutch 33, the control system 20 can open and close the drivetrain 21 independently of the clutch 23 which is to be or operated by the driver. The control system 20 can also switch the engine 22 off and on, and interrupt the fuel supply to the engine 22 and close it again.

The control system 20 can, furthermore, inform the driver about the state of the system and pass on information, for example about the state of the system, to further control systems of the motor vehicle such as, for example, the engine controller. The lines and the signal connections shown in FIG. 2 do not have to be direct connections as illustrated but instead the control system 20 can communicate with further control systems which then in turn connect the sensors 26, 28, and 30, the engine 22, the electronic clutch 33 or further elements. The controller 24 includes executable instructions to implement the algorithm shown in FIG. 1 in order to make a decision about the opening of the drivetrain 21.

Thus, the system of FIG. 2 provides for a vehicle drivetrain system, comprising: an engine; an accelerator providing a torque command to the engine; a transmission coupled to the engine, the transmission including a driver operated clutch and a clutch that is not operated via the driver; and a controller including instructions for disengaging the clutch that is not operated via the driver in response to absence of input to the accelerator. The vehicle drivetrain system includes where the controller receives input from a brake and the accelerator, and where the clutch that is not operated via the driver is opened when the brake and the accelerator are not applied by the driver. The vehicle drivetrain system further comprises additional controller instructions for operating the clutch that is not operated via the driver in response to vehicle speed, gear speed, or state of a trailer hitch receiver. The vehicle drivetrain system includes where the clutch that is not operated via the driver is an electrically operated clutch.

In some examples the vehicle drivetrain system further comprises additional controller instructions for closing the clutch that is not operated via the driver when the driver operated clutch is applied. The vehicle drivetrain system further comprises additional controller instructions for stopping fuel flow to the engine before the clutch that is not operated via the driver is disengaged. The vehicle drivetrain system also further comprises additional controller instructions for engaging the clutch that is not operated via the driver in response to the driver applying the driver operated clutch.

As will be appreciated by one of ordinary skill in the art, routines described in FIG. 1 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle drivetrain, comprising: automatically decoupling an engine from vehicle wheels in response to a driver releasing an accelerator pedal, the vehicle drivetrain including a driver operated clutch.

2. The method for operating the vehicle drivetrain of claim 1, where a state of a brake pedal is detected, and where the vehicle drivetrain is opened via another clutch when the driver releases the accelerator pedal and does not activate the brake pedal.

3. The method for operating the vehicle drivetrain of claim 1, where a state of a clutch pedal, a selected gear speed, a speed of a vehicle, an ambient temperature, a road gradient, and a state of a trailer hitch receiver are detected, and where the driver operated clutch is also automatically operated.

4. The method for operating the vehicle drivetrain of claim 1, where a drivetrain clutch is opened independently of a position of a clutch pedal.

5. The method for operating the vehicle drivetrain of claim 1, further comprising ceasing combustion in the engine after the engine is decoupled from vehicle wheels.

6. The method for operating the vehicle drivetrain of claim 5, where combustion in the engine is ceased via stopping fuel flow to the engine via a fuel injector.

7. The method for operating the vehicle drivetrain of claim 1, further comprising coupling the engine to vehicle wheels after the engine is decoupled from vehicle wheels in response to the driver operating the accelerator pedal, a brake pedal, or a driver operated clutch pedal.

8. A method for operating a vehicle drivetrain, comprising:
stopping fuel flow to an engine while a driver operated clutch pedal is not operated; and
automatically decoupling the engine from vehicle wheels while the driver operated clutch pedal is not operated in response to a driver releasing an accelerator pedal.

9. The method for operating the vehicle drivetrain of claim 8, further comprising basing the automatic decoupling of the engine from vehicle wheels depending on a road gradient.

10. The method for operating the vehicle drivetrain of claim 8, further comprising basing the automatic decoupling of the engine from vehicle wheels depending on a state of a trailer hitch receiver.

11. The method for operating the vehicle drivetrain of claim 10, where the automatic decoupling of the engine from vehicle wheels is suspended when a road gradient is greater than a threshold gradient and when a trailer is coupled to the trailer hitch receiver.

12. The method for operating the vehicle drivetrain of claim 8, further comprising coupling the engine to vehicle wheels in response to the driver applying the accelerator pedal and starting the engine after the engine is coupled to vehicle wheels.

13. The method for operating the vehicle drivetrain of claim 12, where the engine is started without an electric starter.

14. A vehicle drivetrain system, comprising:
an engine;
an accelerator providing a torque command to the engine;
a transmission coupled to the engine, the transmission including a driver operated clutch and a clutch that is not operated via the driver; and
a controller including instructions for disengaging the clutch that is not operated via the driver in response to absence of input to the accelerator.

15. The vehicle drivetrain system of claim 14, where the controller receives input from a brake and the accelerator, and where the clutch that is not operated via the driver is opened when the brake and the accelerator are not applied by the driver.

16. The vehicle drivetrain system of claim 14, further comprising additional controller instructions for operating the clutch that is not operated via the driver in response to vehicle speed, gear speed, or state of a trailer hitch receiver.

17. The vehicle drivetrain system of claim 14, where the clutch that is not operated via the driver is an electrically operated clutch.

18. The vehicle drivetrain system of claim 14, further comprising additional controller instructions for closing the clutch that is not operated via the driver when the driver operated clutch is applied.

19. The vehicle drivetrain system of claim 14, further comprising additional controller instructions for stopping fuel flow to the engine before the clutch that is not operated via the driver is disengaged.

20. The vehicle drivetrain system of claim 19, further comprising additional controller instructions for engaging the clutch that is not operated via the driver in response to the driver applying the driver operated clutch.

* * * * *